United States Patent Office 3,131,243
Patented Apr. 28, 1964

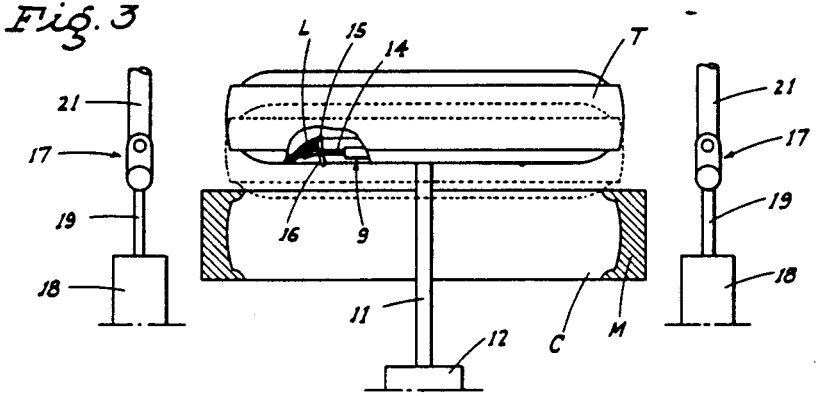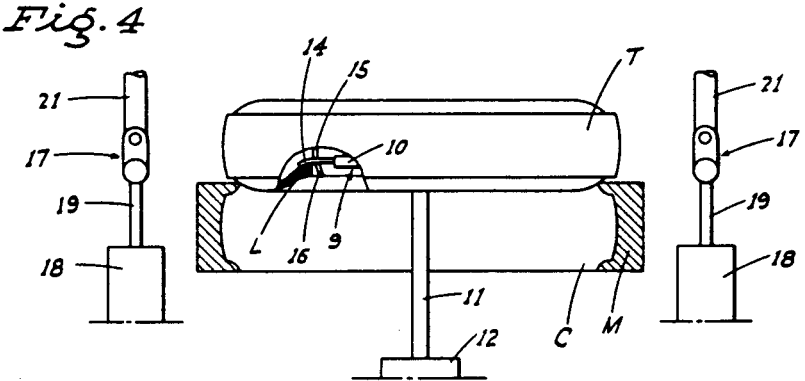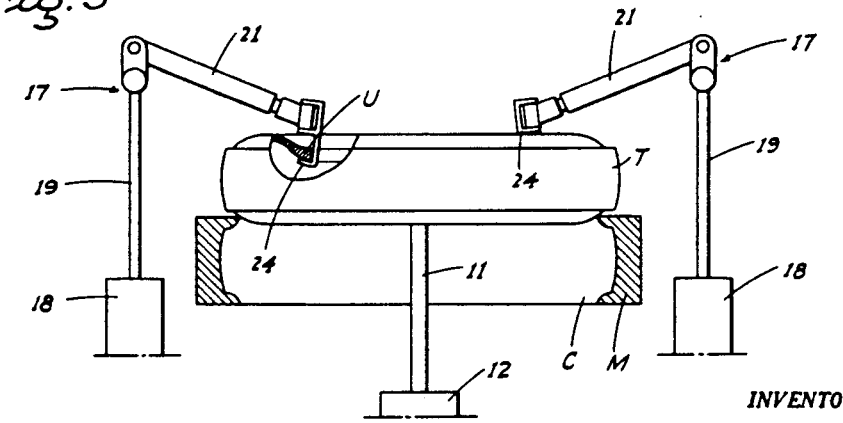

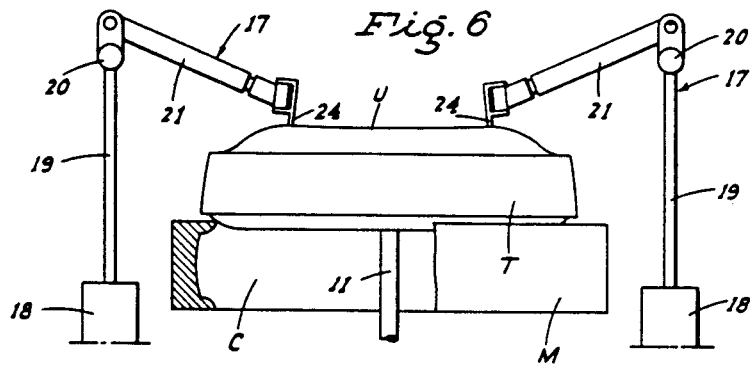
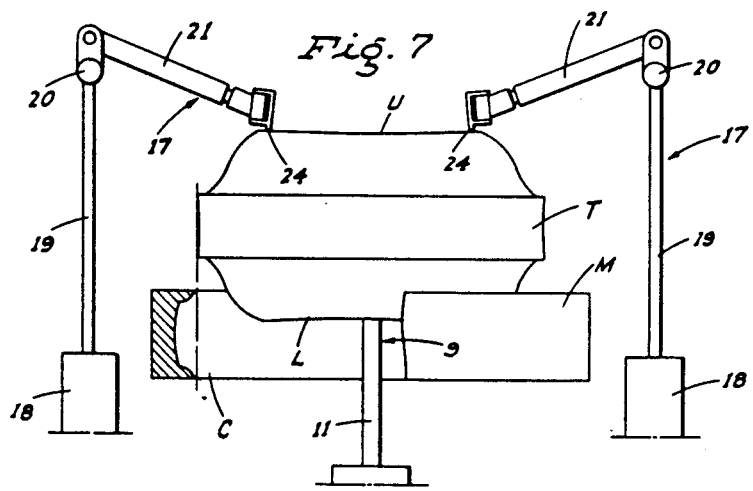
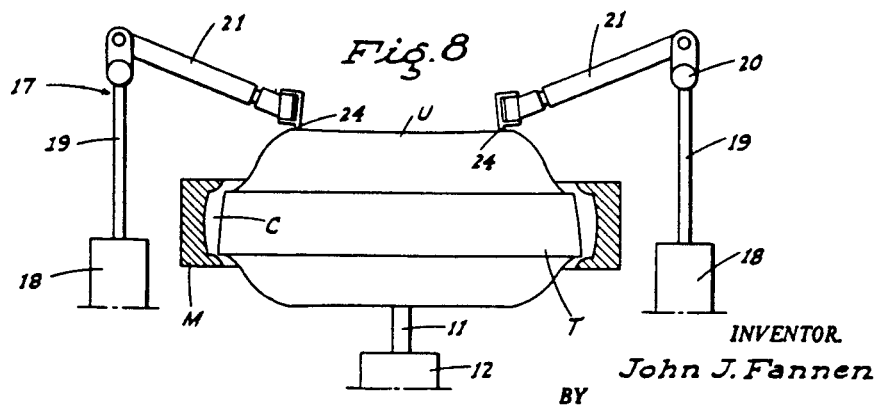

3,131,243
METHOD OF AND APPARATUS FOR INSERTING A TIRE INTO, AND REMOVING THE SAME FROM, A MOLD
John J. Fannen, Lodi, Calif., assignor to Super Mold Corporation of California, Lodi, Calif., a corporation of California
Original application July 2, 1956, Ser. No. 595,370, now Patent No. 2,923,527, dated Feb. 2, 1960. Divided and this application Nov. 6, 1959, Ser. No. 851,391
3 Claims. (Cl. 264—334)

This invention relates to the tire-retreading industry; the present application being a division of my copending application, Serial No. 595,370, filed July 2, 1956, and now United States Patent No. 2,923,527, dated February 2, 1960, and dealing particularly with the method employed for inserting a tire into a full-circle mold for retreading, or removing the tire from such mold.

The principal object of the present invention is to provide what is believed to be a novel method of manipulating a tire so that it may be quickly and easily placed into, or removed from, such a mold.

Another object of the invention is to provide certain apparatus features, particularly with respect to the movement of the mold to and from the apparatus, which have been found to enable the above method to be carried out in the most effective and expeditious manner.

An additional object of the invention is to provide a practical and reliable method of inserting a tire into, and removing same from, a mold, and one which will be exceedingly effective for the purpose for which it is designed.

These objects are accomplished by means of such structure and relative arrangement of parts as will fully appear by a perusal of the following specification and claims.

FIGS. 3-8 inclusive are diagrammatic views illustrating the sequential steps involved in the method of inserting a tire into the mold.

Referring now more particularly to the drawings, and to the characters of reference marked thereon, the apparatus, by means of which the method is performed, comprises a main upstanding frame, indicated generally at 1, and which at the top includes a horizontal platform ring 2 of substantial diameter. At circumferentially spaced points relative to the axis of the ring, the latter is fitted on top with a number of circumferentially spaced, rotatable plates 3 which together form a platform or platen for the support of a full-circle or band-type mold M. Such a mold is lifted into position on the plates 3 by means of a suitable hoist, indicated in part at H, and engaging diametrally opposed, outwardly projecting trunnions or pins on the mold, and one of which is shown at P in FIG. 1. The mold, after being raised above the plates 3 and disposed in substantially coaxial relation with ring 2, is then lowered onto said plates 3.

Figure 1:
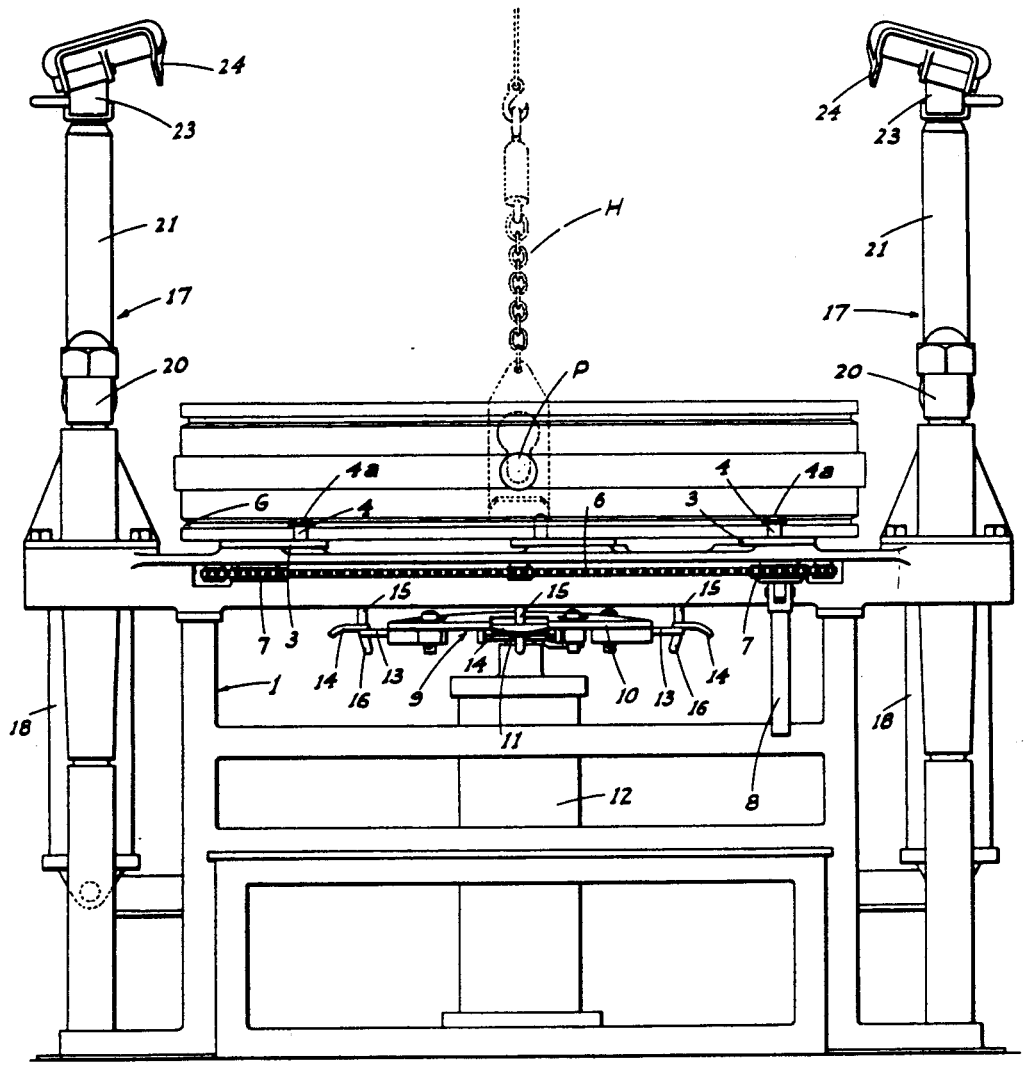
FIG. 1 is a front elevation of the tire spreading apparatus used in carrying out the improved method, showing a tire-receiving mold as initially lowered into place on the apparatus.

The plates 3 are provided with upstanding pins 4 eccentric to the axial mounting shafts 5 of said plates and normally clear of the seated mold, and engageable with the outer peripheral face of the mold—upon simultaneous rotation of the plates in one direction—to center the mold relative to the axis of the ring 2. Certain ones of the pins 4 have enlarged heads 4a arranged to enter a circumferential groove G in said peripheral face of the mold, as shown in FIG. 1, when the pins 4 are engaged with the mold, so as to then hold the mold down against the supporting plates 3.

The desired rotation of the plates 3 may be effected by suitable means, such as is shown in said Patent No. 2,923,527, and which consists essentially of an endless chain 6 under ring 2, and trained about sprockets 7 secured on said shafts 5 of the plates 3 and rigid therewith; a handle 8 being applied to one sprocket so that said sprocket, and the others as well by reason of the connecting chain 6, may be readily turned.

The mold M is formed with an open-ended matrix cavity C of somewhat smaller diameter than the actual tread diameter of a tire T to be inserted into the mold so that such tire when initially lowered onto the mold from above will be supported thereby. The diameter of the tire must therefore be reduced in order for said tire to be fitted into the mold.

Upper and lower tire spreading units are employed to effect such reduction in diameter, and in the present instance such units are constructed and arranged as shown in said copending application, and generally as follows:

The lower bead engaging and spreading unit 9 consists essentially of a horizontal disc 10 initially disposed below ring 2 and mounted on a depending axial shaft 11 concentric with the ring 2 and the mold M when centered, and projecting from a power cylinder 12 mounted on frame 1. The diameter of disc 10 is less than that of the bead diameter of the tire and of the bore of ring 2.

Slidably mounted on the disc for movement radially thereof are circumferentially spaced slides 13, each one at its outer end being fitted with a rigid, outwardly projecting bead engaging pad 14 having a bead-fitting, downturned outer end, as shown.

Each bead engaging pad at its inner end is provided with an upstanding pin 15 and with a depending pin 16, these pins acting as stops and tire centering elements, as will be seen.

When the slides are retracted the pads 14 will clear the tire beads, and when advanced either the pins 15 or the pins 16 will engage the beads at their base.

The upper bead engaging and spreading unit is comprised of a pair of opposed and separate, initially upstanding swing arm and bead engaging hook assemblies, each being indicated generally at 17. These assemblies are duplicates of each other and are supported from frame 1 laterally out from the supported mold M.

Each such assembly, as shown in the aforementioned copending application, comprises an upstanding power cylinder 18 mounted on frame 1 and having a piston rod 19 projecting from the upper end thereof.

A guided cross head 20 on the upper end of the piston rod pivotally supports an extensible or telescopic spring-retracted swing arm 21 yieldably maintained in a vertical position by a suitably arranged spring 22. The swing arm is mounted so that when swung down it will overlie the adjacent portion of the mold and tire in radial relation thereto.

Figure 2:
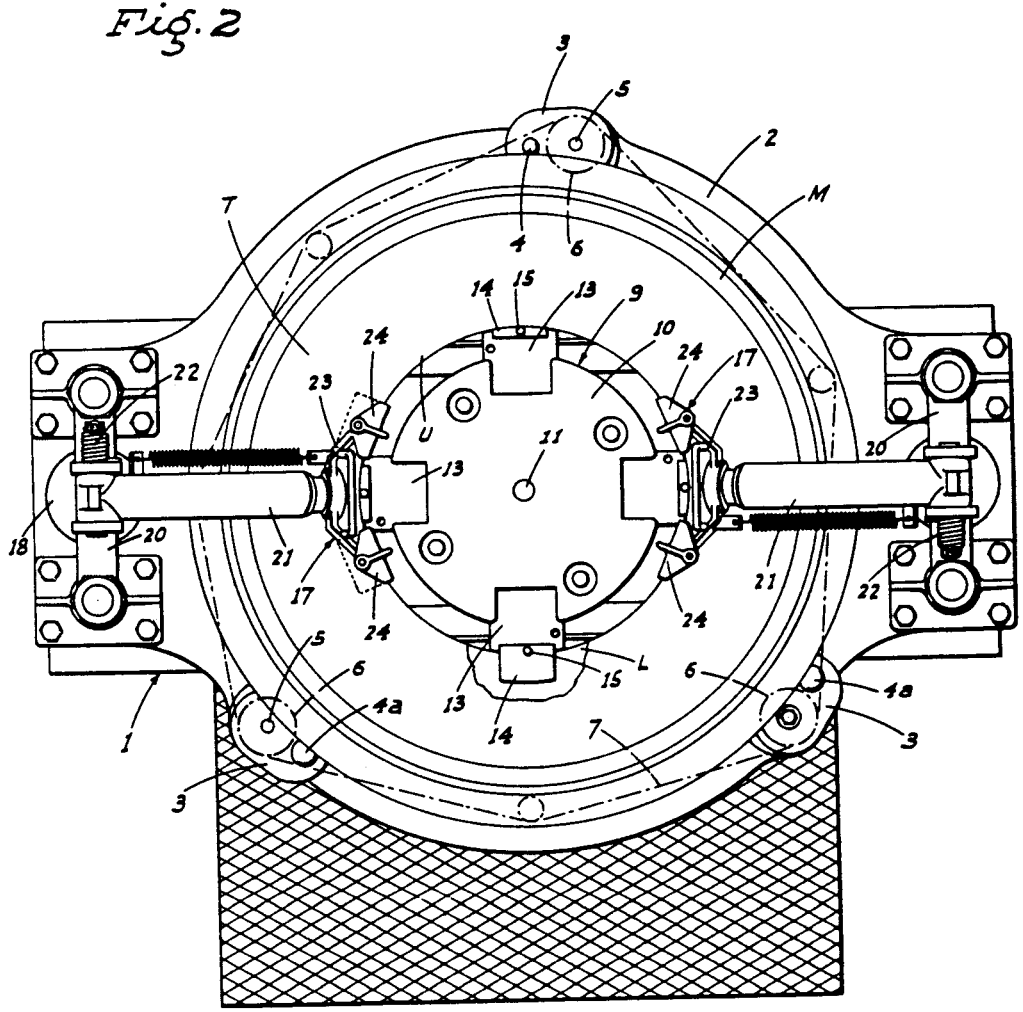
FIG. 2 is a top plan view of the apparatus, with a tire mounted in the mold and partly broken out, and showing both the upper and lower tire-bead engaging and spreading units in working positions preparatory to axially separating such beads.

Mounted on the outer end of the swing arm 21 is a transversely extending carrier 23, which at its ends is fitted with pivotally attached bead engaging hooks 24; the pivotal mount of said hooks being so disposed that they are swingable about generally upstanding axes when the swing arm is in its lowered and radially projecting position relative to the tire, as shown in FIG. 2.

With the mold M thus seated on the plates 3 and centered relative to the lower spreader unit 9, with said unit in its lowered position and with the swing arms 21 of the upper spreader assemblies 17 in their raised position, the device is used in the following manner to insert a tire into the mold:

Particularly by reference to FIGS. 3–8, which illustrate diagrammatically the sequential steps of the method, a tire T is first laid on the mold in generally centered relation thereto, as indicated in dotted lines in FIG. 4. As previously indicated, the tire—with the new tread rubber or camelback thereon—is of too great an outside diameter for insertion into the mold cavity C without reduction of such diameter sufficiently to enable the tire to be moved axially into the mold.

To accomplish this, the slides 13 of the lower spreader unit 9 are first advanced from the disc 10 so that the pads 14 underlie the lower bead L of the tire. The disc 10 is then raised by the power cylinder 12 until said pads engage said lower bead from the under side; the disc being then further raised until the tire is lifted clear of the mold, as shown in FIG. 3. The tire is then manipulated, if necessary, so that the pins 15 accurately center the tire relative to the mold.

The disc 10 is then lowered until the tire returns to its seated position on top of the mold and now accurately centered relative thereto; the disc and pads 14 being then further lowered so that they clear the tire.

The slides 13 are then retracted so as to clear the tire, and the disc 10 is again raised to dispose the pads 14 above the lower bead L but below the upper bead U of the tire. The slides 13 and pads 14 are then again advanced so that the pads overlie the lower bead L. The disc 10 is then lowered sufficiently to cause the pads 14 to engage and bear down with a slight pressure on said lower bead, as shown in FIG. 4. The depending pins 16 prevent any undesirable radial shifting of the tire relative to the disc.

The swing arms 21 of the upper spreader units 17 are then manipulated in succession so that each swing arm in turn overlies the adjacent side of the tire, and so that the hooks 24 are engaged with the upper bead U from below, as shown in FIG. 5; such engagement being maintained by reason of the inherent retracting tendency of the telescopic swing arms.

The power cylinders 18 are then simultaneously operated to raise both swing arms and the bead engaging hooks mounted thereon, which causes the upper bead U to be pulled upwardly a substantial distance, as shown in FIG. 6.

The disc 10, which is held stationary during the raising of the swing arms 21 of the upper spreader units, is then moved downwardly by operation of the power cylinder 12, while the upper spreader units are held stationary. This results in the lower bead L, already engaged by the pads 14, being pulled down a distance comparable to that which the upper bead U was previously moved upwardly, as illustrated in FIG. 7. These two combined bead spreading operations result in a substantial reduction of the overall diameter of the tire, or to an extent sufficient that it may freely enter the mold cavity from above, as indicated in said FIG. 7.

With the diameter of the tire so reduced, the power cylinders 12 and 18 of both spreader units are operated simultaneously and at the same speed to lower the tire into the mold until said tire is centrally located in the mold, as shown in FIG. 8.

The disc 10 is then raised slightly by operation of the power cylinder 12, which allows the lower tire bead L to raise sufficient to cause the tire to begin to expand into the cavity C, as shown in said FIG. 8; such raising of the disc being stopped before said lower bead L reaches its normal position.

A conventional curing bag and inside curing rim (not shown) are then inserted into the tire from above. After this is done, the power cylinders 12 and 18 are then operated to raise the disc 10 and lower the swing arms 21 until the beads L and U return to their normal position, at which time the tire has resumed its normal or initial diameter and is fully expanded into the mold cavity C.

The pads 14 and hooks 24 being then free of the tire beads, said pads may be readily retracted to enable the disc 10 to be lowered to its starting position, and the swing arms 21 to be swung to their vertical out-of-the way position.

The mold, with the tire thus inserted therein, is then released from the centering and holding pins 4 by suitable manipulation of the rotary plates 3. The mold is then picked up by the hoist and conveyed to a predetermined point in the shop for the tire vulcanizing operation.

After such operation has been completed the mold is returned to the spreading apparatus, which is then used to remove the tire from the mold; the previously described tire inserting steps being again resorted to, but in the reverse order.

From the foregoing description it will be readily seen that there has been produced such a method of inserting a tire into, and removing same from, a mold as will substantially fulfill the objects of the invention as set forth herein.

While this specification sets forth in detail the present and preferred method, still in practice such deviations therefrom may be resorted to as do not form a departure from the spirit of the invention, as defined by the appended claims.

Having thus described the invention, the following is claimed as new and useful, and upon which Letters Patent are desired:

1. In a method of removing one tire from and introducing another tire into a portable band-type self-contained tread vulcanizing mold, the steps including providing a stationary support for the mold, transporting the mold with said one tire therein to and depositing the same on the support, rigidly but releasably securing the mold to the support in a predetermined position, removing said one tire from the mold and introducing the other tire thereinto while said mold remains so secured to the support, releasing the mold from the support, and then transporting the mold with said other tire therein away from said support.

2. The method of inserting a tire into a portable horizontal full-circle mold having a tire insert cavity smaller in diameter than the normal diameter of the tire, the method comprising the steps of holding the mold stationary, initially resting a tire on the mold in a generally centered position thereon, lifting the tire from the mold while simultaneously accurately centering the tire relative to the mold, lowering the tire onto the mold while maintaining such centered position of the tire, engaging and pulling up on the upper bead of the tire and at the same time lifting the tire off the mold, engaging and pulling down on the lower bead of the tire while holding the upper bead pulled up whereby the tire is distorted and its over-all diameter is reduced to a diameter less than that of the insert cavity of the mold, then lowering the tire into the mold while maintaining the tire thus distorted, and finally releasing the beads from the pulling action.

3. In combination, a frame, a tire supporting and spreading structure mounted in a fixed position on the frame, a full-circle mold separate from the frame, and means on the frame to removably support the mold in centralized relation to the spreading structure; said means comprising a plurality of horizontal, circumferentially spaced plates on which the mold rests, means mounting each plate on the frame for rotation about a vertical axis, elements upstanding from the plates in eccentric relation to the axes thereof whereby said elements engage the periphery of the mold in locating relation when the plates are rotated in a predetermined direction, and means to so rotate said plates.

References Cited in the file of this patent

UNITED STATES PATENTS

| | | |
|---|---|---|
| 1,382,398 | Wildroudt | June 21, 1921 |
| 1,632,830 | Gammeter | June 21, 1927 |
| 1,840,490 | Denmire | June 12, 1932 |
| 2,111,233 | Zangl | Mar. 15, 1938 |
| 2,302,133 | Maze | Nov. 17, 1942 |
| 2,451,097 | Kraft | Oct. 12, 1948 |
| 2,712,156 | Potter et al. | July 5, 1955 |
| 2,915,783 | Fassero et al. | Dec. 8, 1959 |